United States Patent [19]

Cairns et al.

[11] Patent Number: 4,682,848

[45] Date of Patent: Jul. 28, 1987

[54] UNDERWATER-MATEABLE OPTICAL FIBER CONNECTOR

[75] Inventors: James L. Cairns, Mims; Dennis K. Ferbas, Titusville, both of Fla.

[73] Assignee: Lockheed Corporation, Burbank, Calif.

[21] Appl. No.: 789,445

[22] Filed: Oct. 1, 1985

Related U.S. Application Data

[63] Continuation-in-part of Ser. No. 657,223, Oct. 3, 1984, abandoned.

[51] Int. Cl.$^4$ .............................................. G02B 6/38
[52] U.S. Cl. ................................ 350/96.21; 350/96.2
[58] Field of Search ................. 350/96.2, 96.21, 96.22

[56] References Cited

U.S. PATENT DOCUMENTS 4,140,366  2/1979  Makuch et al. .................. 350/96.22
4,606,603  8/1986  Cairns ............................. 350/96.21

Primary Examiner—Eugene R. LaRoche
Assistant Examiner—Steven J. Mottola
Attorney, Agent, or Firm—Brown, Martin, Haller & Meador

[57] ABSTRACT

A low-loss, underwater-mateable optical fiber connector is provided which permits connection between a pair of optical fibers through a fiber-to-fiber butt junction effected by a pair of connector units. Each connector unit houses a fluid-tight interior chamber. A fiber junction contained in one chamber includes an alignment device holding the terminal end of one fiber. The other interior chamber contains a fiber guide and transport mechanism which, when actuated by the joinder of the connector units, provides a fluid-resistant, pressure compensated channel between the chambers and advances the terminal end of the other fiber through the channel to the junction where it is guided into the alignment device to be butt-joined with the one fiber.

48 Claims, 14 Drawing Figures

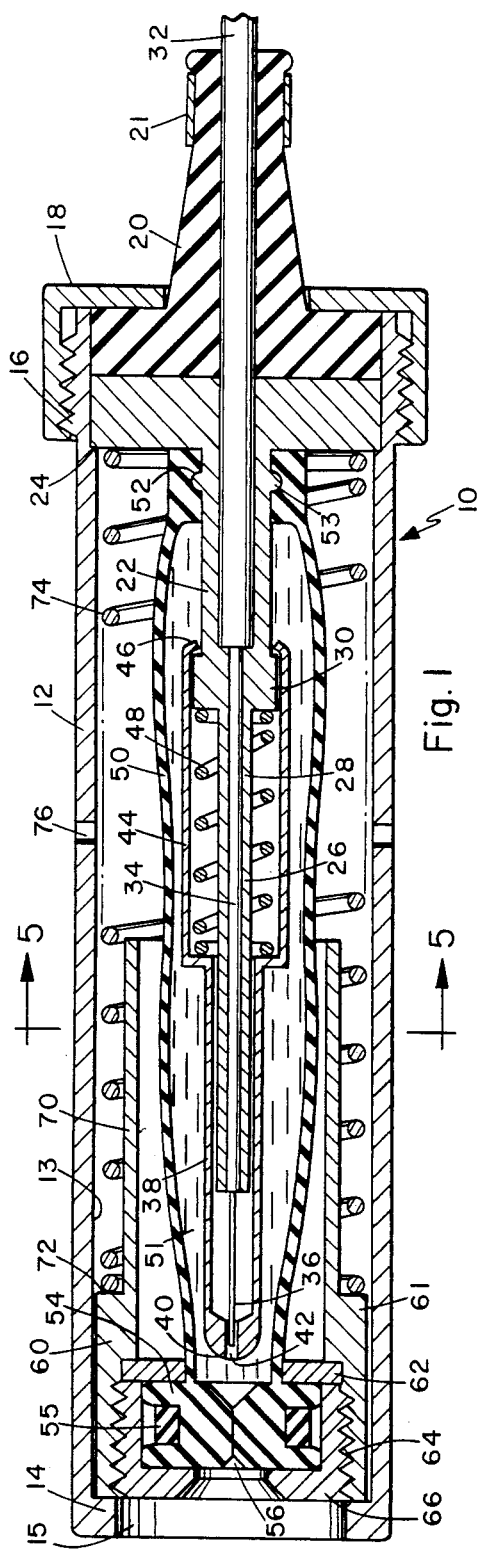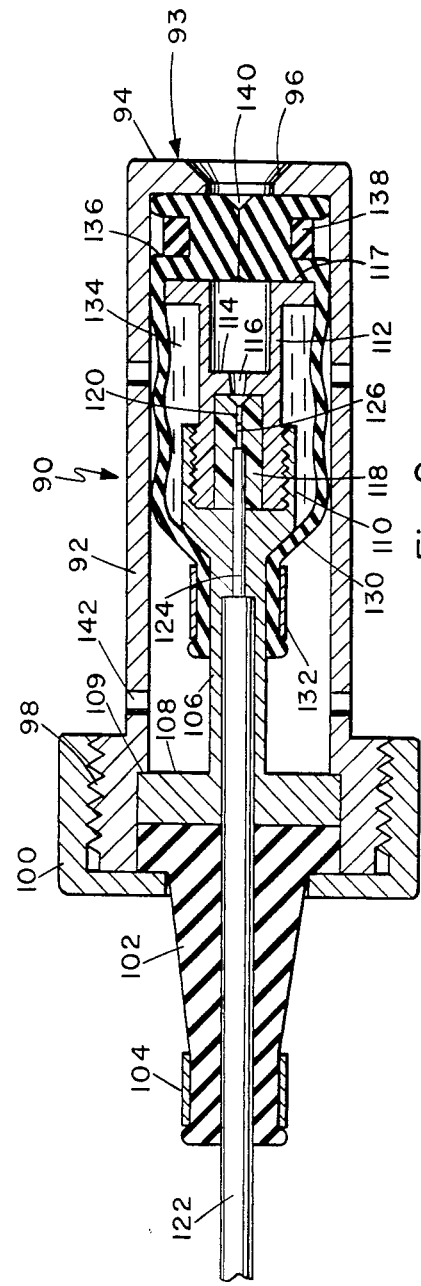

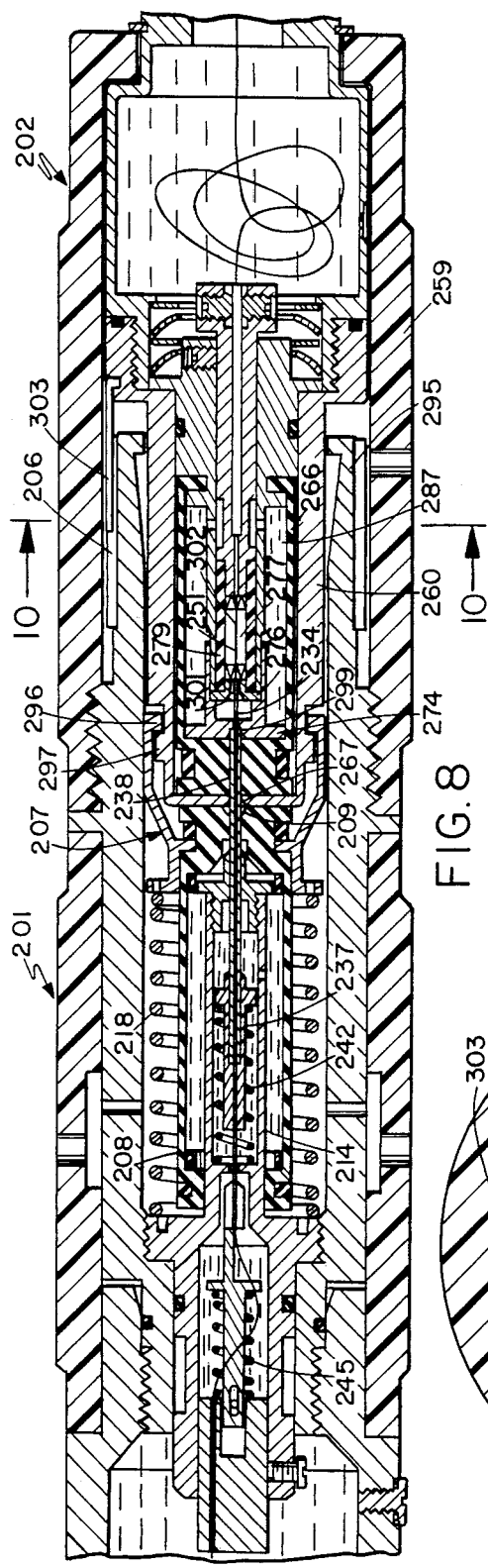
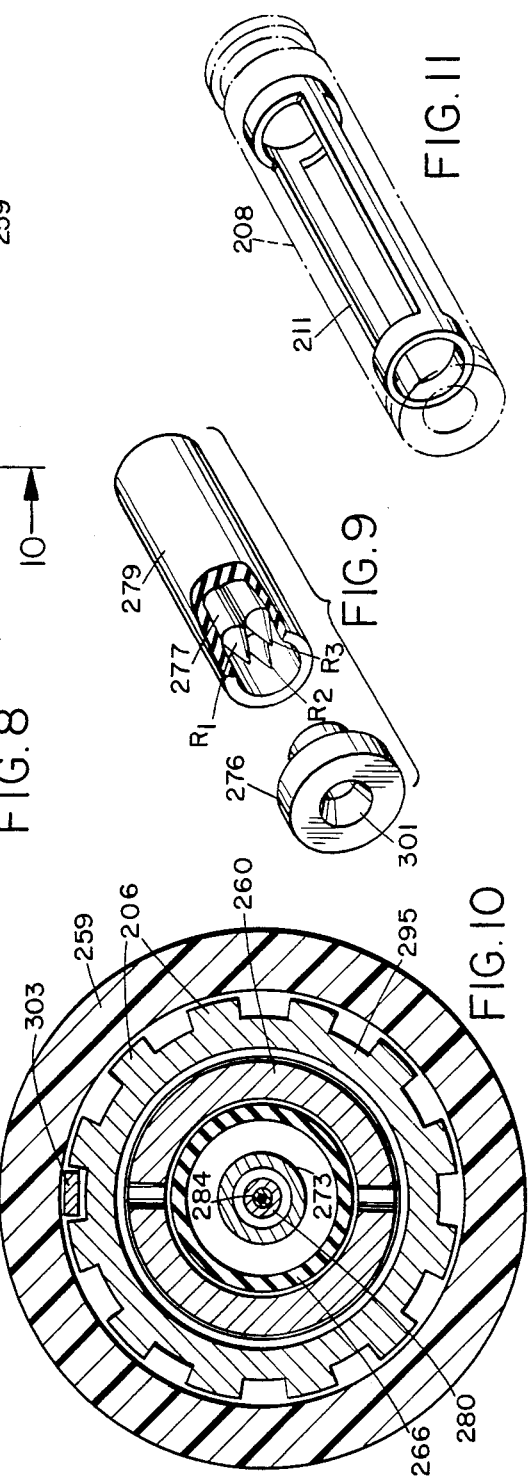

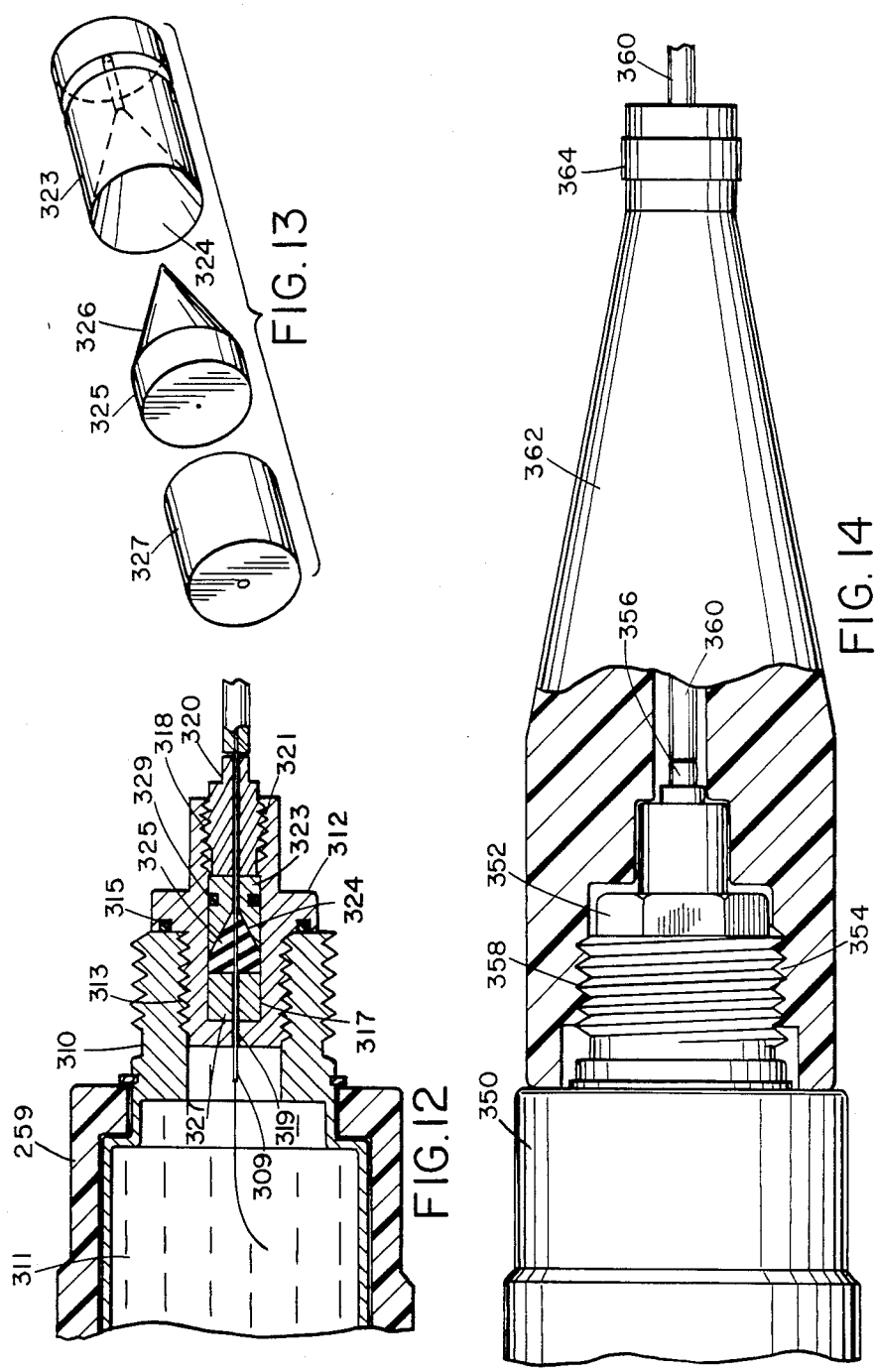

UNDERWATER-MATEABLE OPTICAL FIBER CONNECTOR

This application is a continuation-in-part of application Ser. No. 657,223 filed 10/3/84, now abandoned.

BACKGROUND OF THE INVENTION

The invention relates to the field of underwater optical fiber connectors, and more particularly to underwater-mateable, optical fiber connectors permitting cyclable, direct, fiber-to-fiber butt connection in a high-pressure, hostile undersea environment.

The increased use of fiber-optic systems in the undersea environment has created a need for underwater fiber-optic cable and connector systems. Connectors for optical fibers which can be operated underwater have been developed. Examples of such connectors are found in my U.S. patent application Ser. No. 623,037, now abandoned, and my U.S. patent application Ser. No. 623,038, both assigned to the assignee of this patent application.

While the underwater connectors exemplified by these patent applications do provide a fiber optic channel interconnection which is cyclable underwater, both employ lensing arrangements to transmit light energy between the optical fibers that are being connected. The advantages of these connectors are that they are rugged and protect the optical fibers themselves from exposure to the seawater environment where they could suffer mechanical or corrosive damage. The disadvantage of these lens-type connectors is that, by using lenses, the inherent loss of light energy through the connector is increased. In lensed connectors, energy is lost at the junctions between the lens and fiber, by imperfections in the lenses themselves, by reflections at fiber and lens interfaces, and due to mechanical misalignments.

As is known, very low loss optical junctions are achievable in the laboratory by butting the terminal ends of two fibers directly together within a precision alignment device such as a capillary tube. Advances in connector technology for glass lightguides have provided practical solutions to the problem of butt-joining two optical fibers in a benign, dry environment. However, fiber-to-fiber splicing in an undersea environment presents problems of considerably more difficulty than those encountered in the laboratory. In the undersea environment, when connecting optical fibers, the fibers must be kept from exposure to seawater in order to reduce the possibility of corrosion of the fibers, which would result in increased connection losses. Further, optical fibers are small and very fragile and an underwater connector must provide for handling them with great care yet with great precision. Finally, an undersea fiber-to-fiber connector must be able to carry the fibers to connecting registration many times with predictably repeatable results.

The meritorious effect of the connector of the invention lies in the provision of a controlled, prophylactic environment for optical fibers which can be taken to any ocean depth and within which a low-loss, fiber-to-fiber connection can be made repeatably without exposing the mated fibers to the hostile seawater environment.

It is therefore a primary object of the present invention to provide a connector making a cyclable, low-loss fiber optic junction that is usable underwater.

Another object is to provide such a connector that can withstand the threats of a seawater environment.

Still another object of this invention is to provide a low-loss, fiber-to-fiber connector that can be mated and demated repeatedly in a high ambient pressure without damage to the optical fibers.

SUMMARY OF THE INVENTION

To meet the stated objectives, the present invention provides an optical fiber connector for use in butt-joining a pair of optical fibers underwater. The connector consists of two connector units, each of which carries an optical fiber to be butt-joined with the fiber carried by the other unit. In each unit, the fiber to be joined is enclosed in an interior chamber filled with an optically transmissive fluid. Each chamber insulates the fiber it encloses from the effects of seawater. Each chamber also compensates for differences between the ambient seawater pressure and the pressure surrounding its enclosed fiber by transferring the seawater pressure to the fluid surrounding the fiber. Both chambers have penetrable, fluid-tight seals. A fiber alignment device is disposed in the interior chamber of one connector unit and holds the exposed end of one optical fiber. A fiber guide and transport mechanism in the chamber of the other connector unit encloses the exposed end of another optical fiber that is to be butt-joined with the exposed fiber end in the alignment device. When the connector units are joined, the fiber guide and transport mechanism penetrates both chambers through their fluid-tight seals and moves the fiber end it encloses from the interior chamber where the mechanism is positioned to the interior chamber enclosing the alignment device. There the fiber guide and transport mechanism guides the fiber end to and inserts it into the alignment device, where the fiber end is butt-joined with the fiber end held in the alignment device.

The generic connector of the invention includes a hollow, substantially cylindrical plug unit that contains a hollow support tube which supports the free end of a fiber in the plug unit. A hollow, elongated probe covers the support tube and the fiber end and is movable with respect to the support tube to a position along the support tube which exposes the fiber end. Both the support tube and the probe are disposed in and enclosed by a bladder interior to the plug unit. The bladder has a fluid-tight, movable seal penetrable by the probe. The seal is coaxial with the longitudinal dimension of the probe. When the connector is in use, the seal is displaced with respect to the probe to a position where it is penetrated by and exposes the probe.

The generic connector also includes a hollow receptacle unit which mates with the plug unit when the fibers are to be butt-joined. The receptacle unit includes a stopping surface for engaging the penetrable seal of the plug unit and changing the seal's position relative to the plug unit probe so that the probe penetrates the seal. An interior bladder is provided in the receptacle unit which has a fluid-tight seal also penetrable by the plug unit probe. When the receptacle and plug units are joined and the probe has penetrated the plug unit seal, the probe also penetrates the receptacle unit seal and enters the receptacle unit bladder. A probe receptacle is disposed in the receptacle unit bladder to engage the probe and induce relative motion between it and the enclosed fiber which exposes the plug unit fiber end. Also contained in the receptacle unit bladder adjacent the probe stopping mechanism is a fiber alignment capillary tube which holds the second fiber end and aligns it with the end of the exposed fiber.

The generic connector is expressed in two specific embodiments. In the first embodiment one end of the plug unit interior chamber is anchored, while the end of the chamber containing the penetrable seal is free to move reciprocally along the probe. In the second embodiment, no portion of the plug unit interior chamber is anchored and the entire unit is moveable with respect to the probe and moves between a position which encloses the probe and one in which the probe is unsheathed through the chamber's seal when the chamber is moved with respect to the probe.

As the following description is read in conjunction with the described drawings, it will become evident that the optical fiber connector of the invention accomplishes the above-stated objectives and provides advantages other than those enumerated herein.

BRIEF DESCRIPTION OF THE DRAWINGS

FIG. 1 is a side-sectional view illustrating the plug half of a first embodiment of the connector of the invention.

FIG. 2 is a side-sectional view illustrating the receptacle half of the connector first embodiment.

FIG. 8 is a side-sectional view illustrating the second embodiment of the connector of the invention with the two connector halves mated to butt-join a pair of optical fibers.

FIG. 9 illustrates the preferred embodiment of a fiber alignment device in partial cutaway.

FIG. 10 illustrates plug and receptacle parts used in the second embodiment of the connector to prevent axial rotation after mating of the connector units.

FIG. 11 illustrates the structure of an interior chamber in the connector second embodiment.

FIG. 12 illustrates a penetrator device used to lead an optical fiber into a connector unit.

FIG. 13 is an exploded view of a compressible seal assembly in the penetrator device.

FIG. 14 illustrates integral assembly of a connector unit, penetrator, and optical fiber cable for undersea use.

DESCRIPTION OF THE PREFERRED EMBODIMENTS

Figure 3:
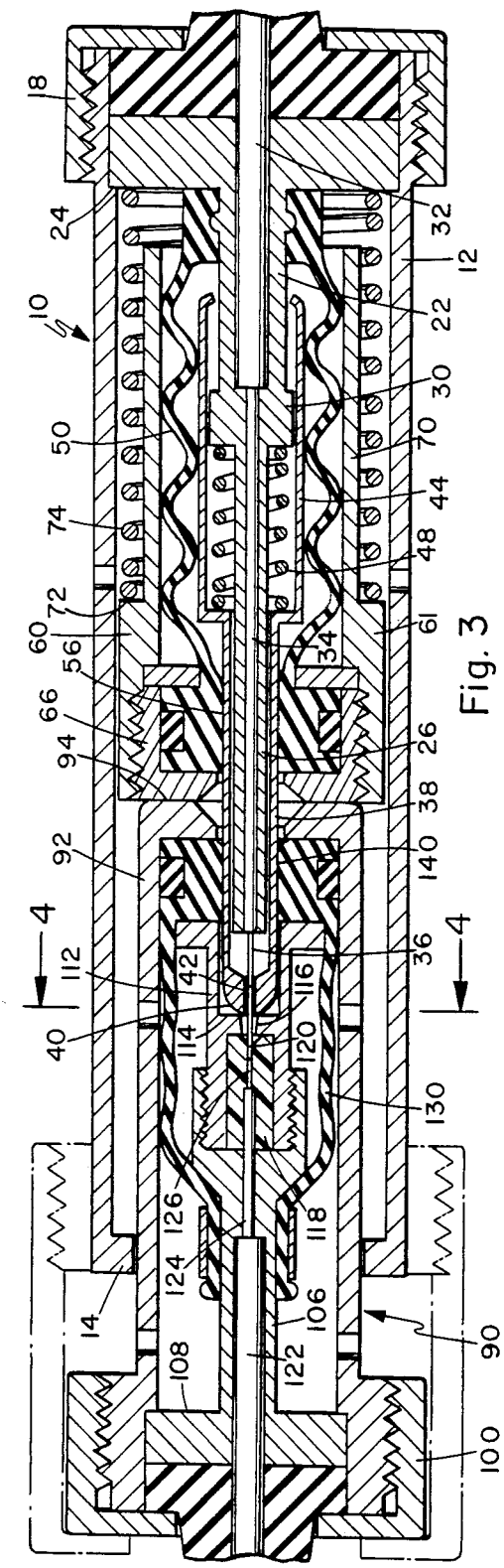
FIG. 3 is a side-sectional view illustrating the first embodiment of the connector of the invention with the two connector halves mated to butt join a pair of optical fibers.
Figure 5:
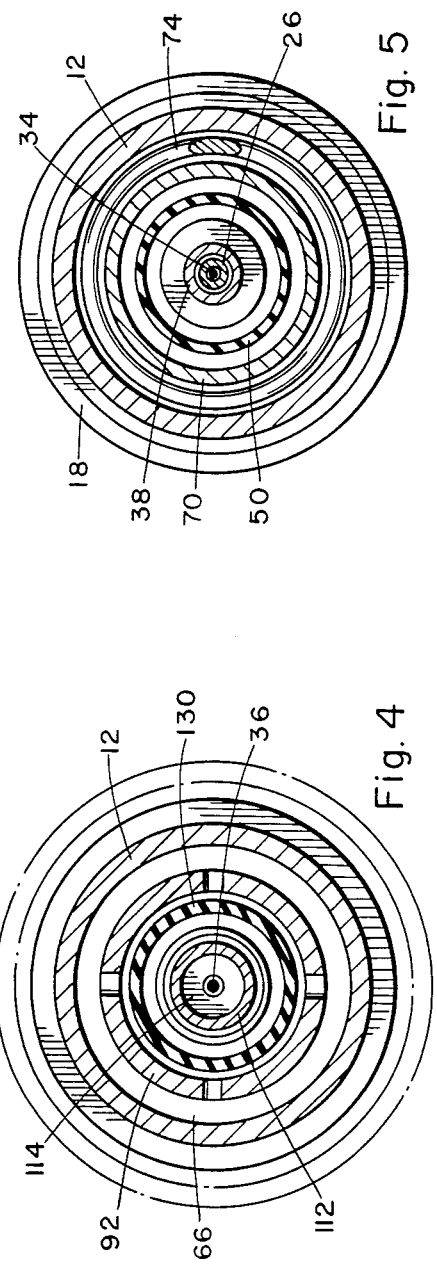
FIG. 5 is a cross-sectional view of the plug half taken along lines 5—5 of FIG. 1.

In this description, reference will be made to fibers, optical fibers and optical waveguides. It is to be understood that all of these terms refer to an optical fiber fabricated from materials whose properties permit the conduction of light from one to the other end of the fiber.

Reference will also be made in this description to plug and receptacle units of a connector. As is known, the term "plug" conventionally refers to a male aspect of a connector, while "receptacle" refers to a female attribute. In keeping with this convention, the plug unit of the embodiments described hereinbelow is the unit containing an elongate member which is inserted into the interior of the receptacle unit when the connector halves are joined. While the generic connector of the invention includes mateable units that can be characterized as being "plug" or "receptacle," it is to be understood that the "plug" and "receptacle" nomenclature is only for the purposes of understanding the following descriptions: in fact, the units are, generically, simply "connector" units.

FIRST EMBODIMENT

The first embodiment of the connector of the invention will now be described with reference to FIGS. 1-5. The first embodiment connector includes mateable plug and receptacle units. The plug unit, indicated generally by 10 in FIGS. 1 and 5, includes a cylindrical casing 12 which can be formed from any material sufficiently rugged to be handled in an undersea environment. The casing 12 is hollow and includes a cylindrical inner surface 13. The forward end of the casing has an annular lip 14 defining a generally circular opening 15. The outer surface at the rear end of the casing 12 carries threads 16 which mate to the threads on the interior surface of a retainer nut 18.

When the retainer nut 18 is screwed on the threaded surface 16, it holds in place a cable termination strain relief plug 20. The plug 20 can be formed from any durable flexible material which is resistant to the corrosive effects of seawater but which has the flexibility required for strain relief of an optical fiber cable. A fiber support assembly 22 is contained in the rear portion of the interior of the casing 12 and includes an annular base 24 disposed adjacent the base of the plug 20 in an interior groove on the inner surface 13. When the retainer nut 18 is threaded to the back of the casing over the strain relief plug 20, both the plug and the support assembly are seated in the groove of the casing 12. The fiber support assembly 22 includes a fiber support tube 26 formed from a rigid material such as stainless steel and having a generally cylindrical, axial passageway 28. An annular probe stopper flange 30 is formed on the fiber support assembly 22 between the fiber support tube 26 and the annular base 24.

An optical fiber cable 32 having a seawater-resistant jacket is held in a central passageway formed from a pair of communicating axial passageways in the plug 20 and the rear portion of the fiber support assembly 22. Before the cable is inserted into the passageway, a portion of the cable jacket is stripped off near one end to expose a length of buffered fiber 34. In addition, a portion of the fiber buffering material is removed at the end of the exposed buffered fiber portion to expose a length of the terminal end 36 of the fiber.

The fiber is held in a generally fixed location which is substantially colinear with the axis of the casing 12 by the constricting band 21 which compresses the plug 20 in the area of the cable 32. In addition, the buffered fiber portion 34 can be held by a bonding agent, such as epoxy, which seats the portion 34 in the passageway 28.

A hollow, cylindrical probe 38 having a forward end 40 with a fiber aperture 42 is disposed in sliding engagement with and over the forward end of the fiber support tube 26. The forward portion of the probe is dimensioned to enclose the end of the tube 26 with the end of the fiber 36 intruding partway into the fiber aperture 42.

At the rear of the probe 38 an enlarged cylindrical spring cavity 44 is formed having a rear retainer lip 46 which engages the rear portion of the probe stopper flange 30 to stop forward movement of the probe 38 beyond the position illustrated in FIG. 1. A partially compressed spring 48 is contained in the cavity 44 to retain the probe 38 in the position illustrated in FIG. 1 by exerting a spring force between the forward end of the spring cavity 44 and the forward portion of the probe stopper flange 30.

An interior bladder 50 fabricated from a water-resistant, flexible material and forming an interior chamber containing a transparent dielectric fluid 51 is disposed in the interior of the casing 12 surrounding the probe 38 and fiber support assembly 22. A groove 52, formed in the base of the bladder 50, cooperates with an annular ridge 53 formed in the fiber support assembly 22 forward of the base 24 to seat the rear of the bladder 50 in the casing 12. The flexible material from which the bladder is formed permits its volumetric shape to assume any one of a continuum of configurations between the elongated one illustrated in FIG. 1 and the retracted one illustrated in FIG. 3.

The bladder 50 includes a molded flanged forward seal 54 which is an integral part of the bladder. The seal 54 has a groove which seats a constricting elastomeric muscle 55. The muscle 55 seals an aperture 56 extending through the flanged seal 54. The aperture 56 is made fluid-tight by the elastomeric band 55 and is penetrable by the probe 38 during the operation described below. Both the bladder 50 and its flanged, forward seal can comprise the dielectric fluid-filled bladder with penetrable seal described in my U.S. patent application Ser. No. 482,919, entitled UNDERWATER CONNECTOR, filed Apr. 7, 1983, assigned to the assignee of this application, and incorporated herein by reference for the purpose of characterizing the bladder 50 and the penetrable seal 54.

The flanged seal 54 is movable relative to the casing 10 and probe 38. Relative motion between these elements is provided by a spring-powered guide mechanism which is disposed in slidable contact with the interior surface 13 of the casing 12. The mechanism consists of a cylindrical spring guide 60 having a forward portion 61 of a radius sufficient to permit the guide to slide with piston-like motion within the casing 12. The guide 60 is itself hollow and includes an interior annular shoulder which stops a seal retainer washer 62. The washer 62 retains the seal 54 and the forward portion of the bladder 52 in place in the spring guide 60. The interior surface of the spring guide 60 adjacent the washer 62 includes a threaded portion 64 which threadably engages a threaded end cap 66. The flanged seal 54 of the bladder 50 is fixedly held between the threaded end cap 66 and the washer 62, which imparts to the seal 54, the movement of the spring guide 60. The diameter of the spring guide 60 transitions abruptly from that of the forward portion 61 to a smaller diameter in the rear portion 70. This forms an annular ridge 72 which engages the forward end of a partially compressed helical spring 74; the other end of the spring 74 is stopped against the base portion 24 of the fiber support assembly 20. The spring guide 60 is stopped by the forward flanged lip 14 of the casing 12.

Use of the connector of the invention in an undersea environment requires equilization of the interior of the connector with the ambient pressure which surrounds it. Equilization is important for keeping seawater from seeping into the interior of the bladder 50 through the fluid-tight aperture 56. In the plug unit 10 of FIG. 1, pressure equilization is afforded through a plurality of radial vents, one of which is indicated by 76, that extend laterally through the casing 12.

With reference now to FIG. 2, a receptacle unit that mates with the plug unit of FIG. 1 will be described. The receptacle unit 90 includes a hollow, cylindrical casing 92 made of a durable, seawater-resistant material. The casing 92 is dimensioned to permit it to be slidably inserted into the casing 12 of the FIG. 1 unit through the opening 15. Then, the units can undergo relative displacement which will cause the front end 93 of the casing 92 and the annular base 24 of the plug support assembly to approach each other. The front end 93 has an annular lip 94 defining a circular front opening 96. The rear surface 98 of the casing 92 is threaded to accept a threaded retainer nut 100 which holds the forward flanged end of a termination strain relief plug 102 inside the casing 92. The flanged end of the plug 102 butts against a fiber optic support and alignment assembly 106, engaging the assembly's annular base 108. The base 108 and flanged end of the plug 102 are seated between the retainer nut 100 and an annular shoulder 109 in the rear interior surface of the casing 92.

The assembly 106 includes a threaded forward receptacle 110 in which a probe receptable 112 having a threaded rear surface is held. The probe receptacle 112 includes a forward probe socket with a rear probe stopping surface 114 and a forward annular flange 117. A fiber passageway 116 is cut through the stopping surface 114 and communicates with the central passage of a precision alignment device 118. In the preferred embodiment, the alignment device comprises a centrally-stored capillary tube. The alignment device 118 is seated in the rear portion of the probe receptacle 112 when the receptacle 112 is threaded into the forward portion 110 of the support and alignment assembly. The alignment device 118 and receptacle 112 are held in coaxial alignment with the casing 92.

The alignment device 118 includes a central, longitudinal, precision passageway 120 for precisely aligning the terminal ends of a pair of optical fibers. The passageway 120 communicates at its forward end with the opening 116 and the probe receptacle 112. At its other end, the passageway 120 communicates through the end of the alignment device 118. The passageway 120 continues through the forward portion of the assembly 106. Midway along the axis of the assembly 106, the interior shaft widens to form, with another similarly-dimensioned shaft in the plug 102, a central opening that extends through the rear of the receptacle unit 92.

An optical fiber cable including an outer jacket 122 has a portion of the jacket 122 removed to expose a length 124 of buffered fiber. Near the end of the fiber, the fiber buffering is removed to expose the terminal end 126 of the cabled fiber. The end of the cable including a portion of the cable jacket 122 extends through the shafts of the plug 102 and at the rear of the assembly 106. The exposed buffered portion 124 of the fiber protrudes through the forward portion of the assembly 106 and into the rear of the passageway 120 cut through the alignment device 118. The fiber end 126 is seated in the precision portion of the passageway 120. The fiber cable is held in the receptacle unit 92 by the constriction band 104 at the rear of the plug 102 and, by any selected seating compound, such as a thermally-bonded epoxy, in the alignment assembly 106. The assembly holds the terminal end of the fiber in substantial coaxial alignment with the casing 92.

A fluid-tight, flexible bladder 130, corresponding to the bladder 50 and forming another interior chamber, is held in the interior of the casing 92 by a constricting band 132 which seats the end of the bladder on the midsection of the support and alignment assembly 106. The bladder 132 is filled with a transparent dielectric fluid 134. The bladder includes a flanged seal 136 having an annular groove in which a constricting elastomeric muscle 138 closes a seal aperture 140. As with the forward seal 54 of the bladder 50, the constricting muscle 138 yields to the insertion pressure of the probe 38 when the probe penetrates the seal aperture 140. The flanged seal 136 is seated in a fixed position relative to the casing 92 between the annular flange 117 and the circular lip 94. A plurality of vents, one indicated by 142, are provided through the casing 92 to equalize the pressure in the casing interior with the exterior ambient pressure surrounding the receptacle unit 90.

Figure 4:
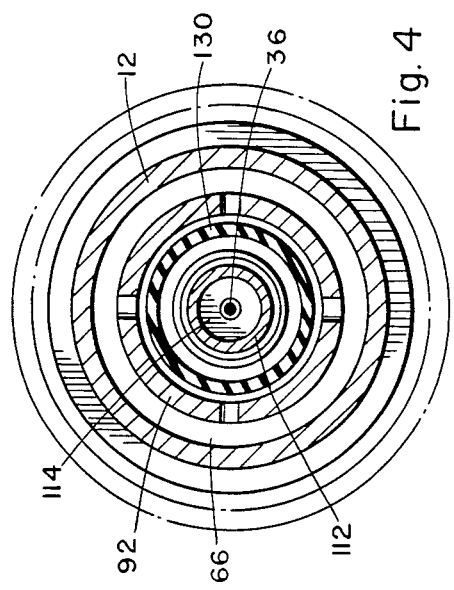
FIG. 4 is a cross-sectional view of the mated connector halves of FIG. 3 taken along lines 4—4 of FIG. 3.

The operable engagement of the units 10 and 90 is illustrated in FIGS. 3 and 4. It should be realized that the units 10 and 90 can be free, or that one can be held in a fixed location while the other is moved to join with it. In any case, it will be apparent from the description to follow that a relative axial motion between the fiber ends 36 and 126 will be induced causing them to close the distance between themselves and to move to a butting, optically transmissive alignment.

In operation, the plug and receptacle units are brought coaxially together so that the forward end of the receptacle unit enters the plug unit through the opening 15. As the plug and receptacle units are pressed together, the front stopping lip 94 of the receptacle engages the end of the threaded end cap 66, forcing the sliding guide assembly 60 back into the interior of the casing 12 toward the annular base 24. As the guide assembly 60 and the base 24 come together, the helical spring 74 is compressed. The stiffness of the spring 48 is such that when the receptacle and plug units are pressed together, the spring 48 does not compress, which forces the end 40 of the probe 38 to penetrate the seal aperture 56 and the seal aperture 140 of the receptacle unit bladder.

When the probe 38 penetrates the seal apertures, the elastomeric muscles 55 and 138 force the seals 54 and 136, respectively, to grip on the outside surface of the probe. This maintains the integrity of the seals against seawater external to the connector units. When the probe penetrates the bladder 130, the probe and the receptacle 112 move together in mating engagement. At this point, a passageway isolated from the environment ambient to the connector extends through the probe 38 between the connector unit bladders within which the fiber end 36 is moved. The passageway is sealed to seawter but permits fluid to flow between the interior chambers. Preferably the fluids 51 and 134 are identical.

When the plug and receptacle units close to the point where the probe tip 40 seats in the probe receptacle 112 against the bottom stopping surface 114, additional force is transmitted through the probe 38 against the spring 48. Now, the insertion pressure that drives the receptacle unit 90 and the plug unit 10 closer together will be directed by the receptacle 112 against the probe 38 and the spring 48. Against this insertion pressure, the spring 48 will compress and, as it compresses, relative motion will take place between the fiber support tube 26 and the passageway formed by the probe 38, with the tube 26 and the end 40 moving toward one another. As this motion continues, the end 36 of the plug fiber will penetrate the probe aperture 42, the probe receptacle aperture 116 and extend into the passageway 120 of the alignment device 118. The length of the exposed fiber end 36 is such that, when the interior spring 48 is compressed to the point where further relative motion between the probe 38 and the fiber guide tube 26 is prevented, the fiber end 36 is precisely butted adjacent the fiber end 120. In the preferred embodiment, a slight excess in the length of the fiber end 36 causes the fiber to flex when butt-joined with the fiber end 126. This creates a spring effect which holds the fiber ends tightly together.

As is known, adjacent butting of the fiber ends in the capillary tube 118 will result in a superior transmission optical interface between the ends. Preferably, the identical dielectric fluids 51 and 134 are both chosen to have an index of refraction that will reduce spreading loss and suppress reflection losses between the fiber ends. Finally, losses due to misalignment of the fiber ends are reduced by the precision machining of the alignment passageway 120 which axially aligns the fiber ends.

Further, the vents 76 and 142 equalize the internal and ambient pressures of the joined connector, permitting it to be cycled and operated at virtually any ocean level including the lower, high-pressure reaches of the ocean.

Although not shown in FIG. 3, any one of a variety of latching mechanisms for holding the plug and receptacle units together in a locked, joined configuration can be used. For example, a locking nut having a threaded interior surface can be rotatably mounted on either of the units to threadably engage a threaded stationary nut surface on the other unit.

When the plug and receptacle units are unmated, the locking mechanism is unlocked and separating motion is induced between the receptacle unit 90 and the plug unit 10. As the receptacle and plug units part, the force which the probe stopping surface 114 has placed on the probe 38 will diminish and permit the spring 48 to expand and push apart the support tube 26 and the probe 38, which will place the fiber end 36 once again in the hollow enclosure of the probe. Simultaneously, the unmating of the units will move the probe end out of the seal aperture 140. Next the spring 74 will expand and induce sliding motion between the sliding guide assembly 60 and the end of the casing 12, causing the seal 54 to move away from the end of the probe 38, once again enclosing the probe in the interior chamber formed by the bladder 50.

The relative strengths of the springs 48 and 74 are critical. The spring 48 must be heavy enough to force the probe 38 through the bladder end seals without compressing. At the same time, the spring force of the spring 74 must be low enough to be overcome by the pressure of the lip 94 against the guide assembly 60. If the spring 48 were too light to hold the probe 38 while the spring 74 was compressing, the plug fiber end 36 would extend through the end of the probe 38 before the probe was completely seated against the probe stopping surface 114, presenting the possibility of damage to the end.

Another feature of the connector of the invention is the wiping action of the seals 54 and 136, which wipe clean the probe end 40 each time it penetrates or is withdrawn from the apertures 140 and 56.

SECOND EMBODIMENT

Figure 6:
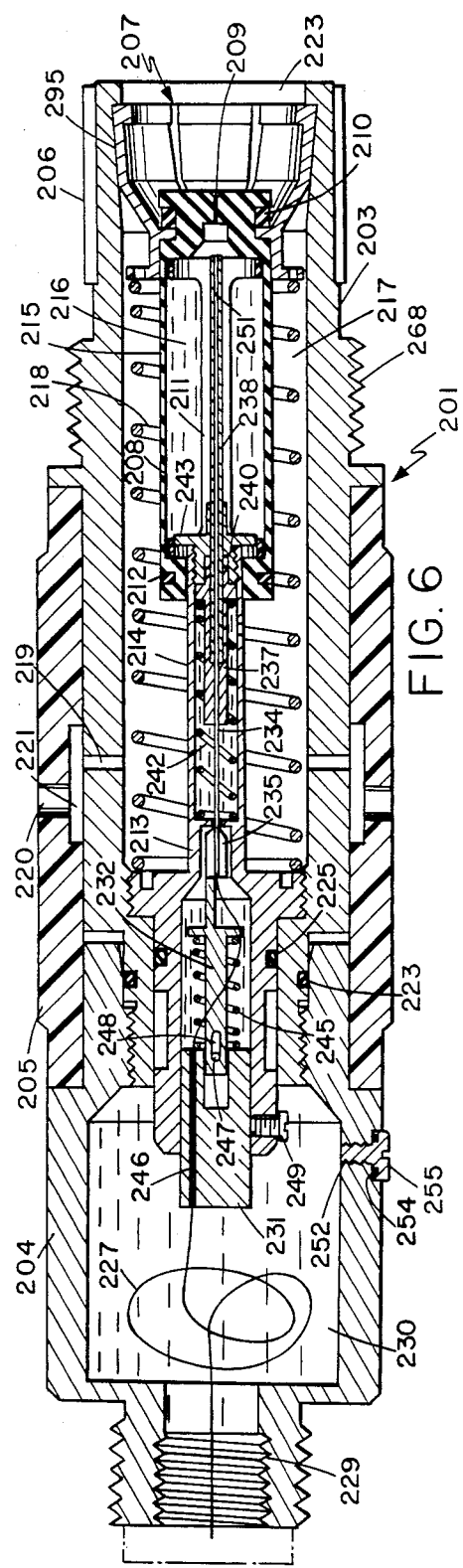
FIG. 6 is a side-sectional view illustrating the plug half of a second embodiment of the connector of the invention.

Refer now to FIGS. 6–11 for an understanding of the second embodiment of the connector of the invention. The connector second embodiment includes mateable plug and receptacle units 201 and 202, respectively. Each unit carries a fiber end to be butt-joined with the fiber end in the other unit. In FIG. 6, the plug unit 201 includes a forward outer body segment 203 which is threaded to a rear body segment 204 to form a continuous plug unit casing. When the forward and rear body segments 203 and 204 are engaged, they capture between them a grip sleeve 205.

The forward body segment 203 has attached to its forward end a toothed annular ring 206. An annular, petalled gripping mechanism 207 is slidably disposed within the forward portion of the forward body segment 203 to be coaxial with the toothed ring 206. Attached to the inner portion of the petalled gripping mechanism 207 is the forward portion of a flexible internal chamber assembly. The internal chamber assembly includes a fluid-tight chamber 208 and spacer 211. The chamber 208 is essentially an elongated bladder formed from a molded elastomeric material that makes the chamber flexible. Such flexibility allows the chamber to perform a pressure compensation function by expanding or contracting in response to the pressure gradient between its external and internal surfaces. The spacer 211 serves to maintain the longitudinal dimension of the chamber 208.

A fluid-tight seal is formed in the forward portion of the chamber 208. The fluid-tight seal includes a perforated opening 209 that is held sealably closed by a compressive force exerted by an elastomeric muscle 210. The rear portion of the chamber 208 is held sealably in place by a compressive anterior muscle 212.

The rear portion of the chamber 208 is seated on an inner plug unit body 213. The inner body 213 is threaded to a rear interior surface of the forward outer body segment 203. The inner body 213 has a bored-out forward extension 214. The anterior constricting muscle 212 keeps the chamber 208 tightly sealed against the inner body extension 214. As discussed in greater detail below, the entire interior chamber assembly sealably slides longitudinally along the inner body extension 214, reciprocating between a forward position when the plug unit 201 is unmated and a rearward position when the plug unit 201 is mated to the receptacle unit 202.

The interior of the chamber 208 forms a cavity 215 which is filled with a lubricating fluid 216 optically matched to the index of refraction of the fibers to be butt-joined in the connector. Another cavity 217 is formed between the forward outer body segment 203 and the combined outer surfaces of the interior chamber 208 and the inner body extension 214. A spring 218 is disposed in the cavity 217 to urge the gripping mechanism 207 and chamber 208 toward the front opening 223 of the outer body segment 203. The cavity 217 is vented to the outside environment through vent passages 219 formed in the forward outer body segment 203 and through vent passages 220 formed in the grip sleeve 205. An annular groove 221 in the grip sleeve insures communication between vent holes 219 and 220 regardless of the relative orientation of the grip sleeve 205. In this manner, when the connector is submerged in the ocean, the ambient undersea pressure is transferred to the outer surface of the chamber 208, and thence to the fluid 216. This ventilation to the environment external to the connector guarantees that there will be no pressure gradient between the fiber on the inside and seawater on the outside of the connector unit 201.

The junction formed between the forward outer body segment 203 and the rear outer body segment 204 is sealed by an O-ring 223. The junction between the interior body segment 213 and the forward outer body segment 203 is sealed by another O-ring 225. The inner body 213 together with the extension 214 forms a rigid housing which contains the male fiber guidance and transport mechanism that inserts one end of an optical fiber into an alignment mechanism contained in the receptacle unit 202. The structure and function of the fiber guidance and transport mechanism is explained in greater detail hereinbelow.

The optical fiber 227 whose end is to be butt-joined with another fiber is led into the plug unit 201 through a pressure-differential optical fiber penetrator, discussed below. The fiber 227 is understood to be contained in an optical fiber cable appropriate for undersea use. Such a cable can comprise, for example, a one millimeter diameter metal tube with a 4 inch bend radius that is attached to the plug unit 201 by a tube fitting (not shown) that is sealably attached to the rear of the plug unit.

The fiber 227 enters into a cavity 230 in the rear portion of the rear body segment 204. An amount of excess fiber is stored in the cavity 230 by configuring several helical coils in the fiber 227. The retention of the excess fiber in the cavity 230 guarantees that tension on the fiber optic cable will not be transmitted through the fiber 227 into the connector. From the cavity 230, the fiber 227 proceeds into a fiber guidance and transport mechanism.

The fiber guidance and transport mechanism consists of a cylinder 231, a holding and guiding device 232, a hypodermic tube 234, a movable guide mechanism 237, a probe 238, a plug 240, a spring 242, and a spring 245. The cylinder 231 has a drill hole 246 for admitting the fiber 227 and a central bore. The central bore of the cylinder 231 receives the rear portion of a movable fiber holding and guiding device 232. A hypodermic tube 234 is firmly attached to the guiding and holding device 232 in the bore provided in the forward extension 235 of the holding and guiding device. The cylinder 231 is lodged in the central bore of a rear portion of the inner body 213. The holding and guiding device 232 and attached hypodermic tube 234 form a unitary fiber holding mechanism that slides back and forth along the axis of the plug unit 201 in the rear cavity of the inner body 213, with the hypodermic tube 234 extending forwardly in the inner body and through a forward central bore of the body 213 into a central bore of the extension 214. The hypodermic tube 234 extends through the central bore of a slidable guiding device 237 in the forward bore of the extension 214. The hypodermic tube 234 extends through the central bore of a guiding device 237 that is coaxially attached to an elongate central tube that forms a probe 238. The hypodermic tube 234 is free to slide within the probe mechanism consisting of the movable guide mechanism 237 and attached probe 238. The probe mechanism, in turn, is free to slide within the bore of the inner body extension 214. The plug 240 that is threaded into the end of the extension 214 serves as an alignment device for the probe 238 and is a stop for the movable guide mechanism 237.

The probe mechanism is urged against the plug 240 by the force of a spring 242, which tends to move the movable guide mechanism 237 against the plug 240. A flange 243 on the plug 240 serves as a stop for the chamber spacer 211, keeping the chamber 208 from sliding beyond the end of the inner body extension 214. A spring 245 provides a force that tends to move the holding and guiding device 232 forwardly in the rear cavity of the inner body 213 and away from the cylinder 231. A retaining pin 247 extends through and is attached to the cylinder 231. The retaining pin 247 also extends through the slot 248 cut in the rear of the holding and guiding device 232. Thus, the retaining pin 247 keeps the holding and guiding device 232 from escaping from the cylinder 231. The slot 248 controls the distance of travel of the holding and guiding mechanism 232 as well as the hypodermic tube 234 attached to it. As will be explained in greater detail below, the spring 245 also serves to control the force with which the faces of the two butt-joined fibers are pressed together. A set screw 249 retains the cylinder 231 in its correct longitudinal position with respect to the rear cavity in the interior body segment 213. As will be evident to the skilled craftsman, the initial tension on the spring 245 and the relative positions of the butt-joined fibers can be adjusted during assembly of the connector second embodiment by using the set screw 249.

The rear cavity 230 and the rear body segment 204 are filled with the same optically-matched fluid 216 as the chamber cavity 215. The rear body segment cavity 230 and the chamber cavity 215 are in communication through a series of vents, which are not shown, extending through the inner body segment 213.

Returning to the course of the fiber 227 into the plug unit 201, from the cavity 230, the fiber 227 proceeds through the drill hole in the cylinder 231 whence it proceeds into the interior of the hypodermic tube 234. The fiber 227 is firmly attached to both the hypodermic tube 234 and the holding and guiding device 232 in the holding and guiding device forward extension 235. The attachment is made with a suitable adhesive such as epoxy; however, a mechanical gripping device can also be used at this point. The forward tip 251 of the fiber 227 extends some distance beyond the end of the hypodermic tube 234. As shown in FIG. 6, both the hypodermic tube 234 and the fiber tip 251 are sheathed by the probe 238.

A filler port 252 permits the entire portion of the plug unit inner space from the cavity 230 to the cavity 215 to be filled with the index-matched fluid after assembly of the plug unit 201. An O-ring 254 and set screw 255 provide a final seal of a fluid-filled portion of the plug unit 201.

Figure 7:
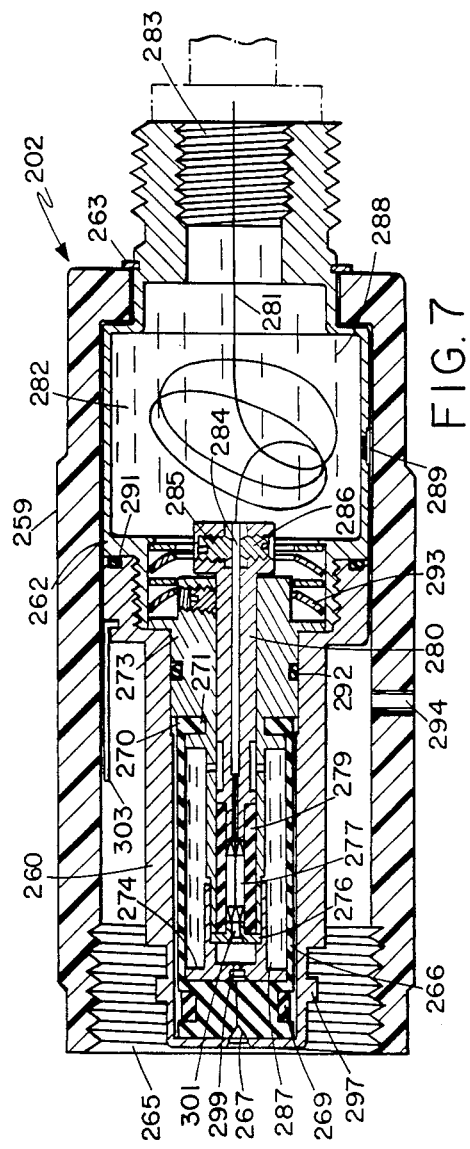
FIG. 7 is a side-sectional view illustrating the receptacle half of the connector second embodiment.

Refer to FIG. 7 now for an understanding of the structure of the receptacle unit 202. The receptacle unit 202 consists of an outer body 259, a forward inner body segment 260, and a rear inner body segment 262. The forward and rear inner body segments 260 and 262 are threaded together, and the outer body 259 is retained on the rear segment 262 by a ring 263. The forward interior surface of the outer body segment 259 has threads 265 that engage with mating threads 268 on the forward portion of the forward outer body 203 of the plug unit 201. The forward body segment 260 of the receptacle unit contains an elastomeric bladder forming an interior chamber 266 having a fluid-resistant, penetrable seal in its forward portion. The penetrable seal consists of an opening 267 and an elastomeric muscle 269. The opening 267 is kept sealed by the compression action of a constricting elastomeric muscle 269. The rear portion of the interior chamber 266 is sealed by a flange 270 that mates to a slot 271 cut in the forward portion of a central body segment 273. The central body segment 273 forms a cylindrical cavity terminated at its forward end by an end cap 274. The inner body segment 273 and the end cap 274 together capture a guide mechanism 276 which, as will be explained below, serves to guide the fiber end 251 in the plug unit 201 into a fiber alignment device 277.

The fiber alignment device 277 is shown in greater detail in FIG. 9 and includes three rods, $R_1$, $R_2$, and $R_3$ that are held tightly in a triangular array within an elastomeric sleeve 279. The triangular array of the alignment device rods forms a cusped central opening into which a fiber end is inserted. The diameters of the alignment rods are chosen so that the opening is equal to or slightly smaller than the diameter of the optical fibers to be butt-joined. Thus, when a fiber end is inserted into the opening between the alignment rods, the tapered rod ends center the fiber end in the opening, while the force pushing the fiber end into the space forces the rods apart slightly to admit the fiber. This expansion of the opening works against the elastomeric sleeve 279, which causes the sleeve and rods to firmly grip the fiber end and to maintain it in position in the alignment device 277.

The passage of the fiber into the opening between the rods is assisted by the lubricating action of the index-matched fluid that bathes the alignment rods as explained below. As two fiber tips are pushed toward each other in the space between the alignment rods from either end of the alignment device, they will be aligned optically by the alignment rods. When the fiber tips are butted together while optically aligned, they will provide a low-loss connective interface.

The operation of the alignment device 277 is superior to that of conventionally-formed alignment devices that use rods to align fibers. Typically, in the prior art alignment devices, the sleeve which holds the alignment rods together is constructed from a non-elastomeric material which does not allow the device to firmly grip the fibers while still compensating for slight manufacturing variations in fiber diameter. In contrast alignment device 277 is self-adjusting for such variations. Another advantage of the alignment device 277 is that the cusped central opening formed by the three rod openings allows fluid ventilation around the fibers as they are inserted into it, and further ventilation compensating for bulk modulus compression of the fibers at high undersea pressures. This stabilizes the performance of the connector of the invention.

Returning to the placement of the alignment device 277 in the receptacle unit of FIG. 7, the position of the elastomeric sleeve 279 holding together the alignment rods is maintained by its contact with the guide mechanism 276 and the extended tip of a centrally-bored fiber holder 280.

A fiber 281 enters the receptacle unit through a port 283. An excess length of the fiber 281 in the form of several helical coils is captured in an anterior cavity 282. The fiber 281 proceeds from the cavity 282 into a segment of hypodermic tubing 284 that extends through the central bore of the alignment device 277. The fiber is firmly held within the tube 284 by an adhesive such as epoxy. The tube 284 in turn is held in position in the alignment device 277 by set screws 285 and 286. The forward tip of the fiber 281 extends midway into the alignment device 277 to be held there for being butt-joined with the end of a plug unit fiber 227.

The cavity 287 of the chamber 266 and the cavity 282 at the rear of the receptacle unit are in communication and both are filled during assembly with the optical index--atching fluid 288 contained in the plug unit through a port containing a seal screw 289. Fluid communication between the chamber 266 and cavity 287 is through the central bore of the fiber holder 280.

The junction between the forward inner body segment 260 and the rear inner body segment 262 is sealed by an O-ring 291. An O-ring 292 seals the junction between the forward inner body segment 260 and the central body segment 273. The central body segment 273 is free to slide within the forward inner body segment 260 to absorb mechanical shocks, but is firmly held in place by a stack of spacers 293. Conventional Belleville washers are used in the second embodiment as spacers 293.

The outer surface of the chamber 266 is vented to the ambient seawater pressure through ports 294 in the outer segment 259 and ports (not shown) in forward segment 260. This permits the ambient pressure to be transferred through the chamber 266 to the fluid 288.

Having described the major components of the plug and receptacle connector units, the mating sequence will now be described to further clarify the functions of the various parts. Refer to FIGS. 6-8 for an understanding of the connector unit mating sequence.

Upon mating, the faces of the plug unit 201 and receptacle unit 202 approach each other with the forward inner body segment 260 of the receptacle unit entering the petaled engagement mechanism 207 of the plug unit. The forward portion of the segment 260 contacts the forward face of the plug chamber 208. Further joining pressure forces the entire plug interior chamber assembly and petaled engagement mechanism 207 to compress the spring 218 and retract into the male forward outer body 203, with the rear portion of the chamber 208 sliding sealably against the interior body extension 214. The inclined inner surface 295 of the forward outer body segment 203 forces the petals of the engagement mechanism 207 closer together. This causes the petaled latches 296 on the engagement mechanism 207 to close around the rear surface of a flange 297 on the receptacle forward body segment 260.

The engagement of the petaled latches 296 with the flange 297 maintains the seal apertures 209 and 267 in close aligned abutment during the connector mating operations described below. Although the plug interior chamber assembly and petaled engagement mechanism slide relative to the interior body extension 214, the probe 238 and all of the fiber quidance and transport mechanism remains fixed with respect to the interior body extension 214. This causes the probe 238 to penetrate the plug chamber seal opening 209. During mating of the units 201 and 202, the receptacle unit chamber 266 is immobile with respect to the chamber unit 202. However, the chamber 266 is moved by the unit 202 into the interior of the plug unit 201, which causes the probe 235 to penetrate the seal opening 267. After penetrating the seal openings, the probe 238 will advance toward the alignment mechanism 277 to be stopped by the flange 298 of the end cap 274 contained in the receptacle chamber cavity 287.

A further engagement of the plug and receptacle units beyond the point where the probe 238 abuts the flange 298 results in a compression of the spring 242 and a concomitant motion of the movable guide mechanism 237 and probe 238 in a rearward direction relative to the interior body extension 214. At this point in the joining of the units, the inner hypodermic tube 234 containing the fiber tip 251 is unsheathed as the mechanism 237 and probe 238 slide back on it.

When the hypodermic tube 234 and fiber tip 251 are exposed, further joining motion of the connector units causes the hypodermic tube 234 and fiber tip 251 to penetrate through an opening 299 of the end cap 274. Further motion causes the fiber tip 251 to enter a tapered port 301 in the fiber guide mechanism 276. Motion of the fiber tip 251 through the guide mechanism 276 causes the tip to enter the alignment mechanism 277. With continued further joining motion of the connector units, the fiber tip 251 meets the receptacle fiber tip 302 that is held in the alignment mechanism 277. Further motion between the plug and receptacle units results in a slight compression of the spring 245, which tends to maintain a relatively constant and controlled force that is transmitted to the fiber tips 251 and 302 through the holding and guiding device 232 to which the fiber 227 is anchored in the forward extension 235. The compression of the spring 245 tends to keep the fiber tips 251 and 302 firmly butted together.

Referring now to FIGS. 6-8 and 10, as the plug and receptacle units come together, a finger 303 that is mounted on the annular base of the forward inner body segment 260 engages a slot in the toothed ring 206, limiting further rotation between the plug and receptacle units. Although the connector units are not keyed and may be mated at any relative orientation, once the fiber tips 251 and 302 come into contact, additional rotation is undesirable. The arrangement of finger 303 and toothed ring 206 permits initial mating at any orientation while restricting rotation between the connector units during final engagement of the units. When the units are fully engaged they are held in operative engagement by rotation of the outer body 259 whose threads 265 engage the threads 266 on the forward outer body segment 203 of the plug unit.

On demating, the threads 265 and 266 are disengaged. The flange 297 and petaled latches 296 are initially engaged. As the plug and receptacle units are moved apart, the flange 297 moves the petaled engagement mechanism 207 together with the interior chamber 208. The withdrawal force continues until the petaled latches 296 are free to expand into the inclined inner surface 295 of the forward outer body segment 203. Once the petaled latches 296 have expanded, the inner diameter of the latches becomes sufficiently large to permit the flange 297 to be completely withdrawn. As the flange is withdrawn, the fiber tips 302 and 251 are unmated when the tip 251 is withdrawn from the alignment mechanism 277. This relaxes the resistance on the spring 245, permitting it to expand and move the holding and guiding device 232 and hypodermic needle 234 forwardly until the pin 247 stops the forward motion. Further withdrawal of the connector units will disengage the forward tip of the probe 238 from the end cap 274 and the seal opening 267 of the receptacle chamber unit. At the moment that the tip of the probe 238 is disengaged from the end cap 274, the spring 242 begins to expand, advancing the movable guide mechanism 237 and attached probe forwardly to once again sheath and enclose the hypodermic tube 234 and fiber tip 251. Virtually simultaneously with the sheathing of the fiber tip 251, the expanding action of the spring 305 coupled with the pulling action of the flange 297 on the petaled engagement mechanism 207 causes the interior chamber 208 to move forwardly in the plug unit, which moves the seal opening 209 away from the probe 238 and once again encloses the probe 238, the hypodermic tube 234, and the fiber tip 251 in the cavity 215 of the chamber.

At all times when the units are demated, mated, or in the process of engagement or disengagement, the fiber tips and exposed fibers are isolated in the prophylactic environment of the index-matching fluid from the effects of seawater. Further, the exposed fibers and tips are insulated from the effects of differential pressure often incurred in underwater operation by the venting of the ambient seawater environment to the outside surfaces of the chambers 208 and 270.

An optical fiber penetrator that is useful for feeding a fiber into each of the connector units of the previously-disclosed connector embodiments, while preserving the pressure integrity of the unit, is illustrated in FIGS. 12 and 13. The penetrator, indicated generally by 308, feeds a fiber 309 into a connector unit 310 such as one of the connector units described hereinabove. It is to be understood that the penetrator faces a chamber 311 of the unit 310 that is filled with the optical matching fluid previously described. The penetrator feeds the fiber 309 from a low pressure environment external to the connector, such as the pressure in an optical fiber cable (which is not shown). The fiber 309 is fed to the rear chamber of the connector which is at ambient sea pressure by virtue of pressure transfer to the fluid in the rear chamber, while preventing fluid flow between the interior and exterior of the connector unit.

The penetrator includes a housing 312 that threads by threaded surface 313 to the rear portion of a connector unit 310, which can comprise, for example, one of the connector units for the two embodiments previously described. An O-ring 315 provides a sealing barrier between the housing 312 and the connector unit 310 that prevents the exchange of fluid between the interior and exterior of the connector unit that would occur between the housing and the connector unit. The housing has a central bore 317 that is threaded in its forward portion at 318. When installed in a connector unit, the threaded opening 318 of the bore is oriented toward the exterior of the connector unit. At the opposite end of the bore 317 the radius decreases to form an aperture 319 that opens to the interior of the connector unit 310.

A compressive sealing assembly is held in the portion of the bore 317 between a retaining plug 320 and the small-diameter aperture 319. The compressive sealing assembly provides fluid seals between the bore 317 and itself and between itself and the fiber 309. In addition, the compressive sealing assembly provides a pressure barrier by acting against a circumferential portion of the surface of the fiber 309.

The compressive sealing assembly consists of a compression cone 323, a compressible elastomeric seal 325, a seal follower 327, and an O-ring 329. The compression cone 323 consists of a plug at one end of which is an inwardly-sloping receptacle opening having a substantially conically-shaped surface 324. The compressible elastomeric seal 325 has a conically-shaped plug extension 326 that fits to the receptacle opening 324 of the compression cone 323. The seal follower 327 is a cylindrical plug. As shown in FIG. 13, the plug 320, cone 323, seal 325, and seal follower 327 are all centrally bored so that the fiber 309 can be fed through the penetrator.

When the penetrator is assembled, the housing 312 is threaded into the rear of the connector receptacle 310 to be concentric with the aperture through which the fiber 309 is to be fed into the connector unit. Then the compression assembly is assembled as shown in FIG. 14 and placed into the bore 317. The retaining plug 320 is threaded partially into the threaded end of the bore 317 and the fiber 309 is fed through and along the central axis of the penetrator 308, passing through the aperture 319, the compressive seal assembly, and the retaining plug 320 into the interior of the connector unit 310. After the fiber 309 is fed through and its end positioned in the connector unit 310, the retaining plug 320 is screwed the rest of the way into the threaded portion of the bore 317 to exert a light compressive force against the compression cone 323. This light compressive force is transmitted by the cone to the compressible seal 325 which squeezes the seal circumferentially against the outer surface of the longitudinal portion of fiber 309 that passes through the seal 325. Then, the connector unit 310 is mated with its opposite number to form a connector which is submerged in the high pressure environment of the ocean.

As the pressure acting through the aperture 319 increases, the pressure is transferred through the aperture 319 to act against the compressible seal 325. As the pressure rises, the compressible seal 325 is forced harder against the compression cone 323 which causes a further compressive sealing force against the fiber 309 to be added to that exerted by the retaining plug 320. The compound sealing force that forms the seal 325 against the fiber 309 prevents the transfer of fluid and pressure between the interior and exterior of the connector unit. The sealing force against the fiber 309 that is exerted by the compressible seal varies from the initial level set by the retaining plug 320 according to the pressure that is transferred through the aperture 319.

The O-ring 329 completes the fluid exchange barrier by providing a seal between the bore 317 and the compression cone 323.

It should be evident that the penetrator 308 of FIGS. 12 and 13 minimizes losses in the optical fiber 309 that are caused by compression of the fiber. Since the compressible elastomeric seal 325 is symmetrical with respect to the fiber 309, it uniformly distributes the pressures of the plug 320 and the ambient environment over the outer surface portion of the fiber 309 that it contacts. This reduces the propagation of loss-producing stress interfaces in the fiber 309 that would be caused by the asymmetrical application of compressive force on the fiber 309.

The skilled artisan will realize that the ambient high pressure exerted against the seal follower 327 through the port 319 can result from submergence of the connector unit 310 beneath the surface of water, in which case the pressure acting through the port could be derived from the ambient pressure of the water environment acting through the optical index matching fluid in the rear chamber 311 of the connector unit.

The penetrator of FIGS. 12 and 13 is useful not only in connection with the above-described connector embodiments. It is also employable in other applications where an optical fiber must extend through a pressure differential barrier. The hull of a submerged submarine, submergible equipment cannisters, and the fuselage of a space station are two examples of such barriers.

Refer to FIG. 14 for an illustration of an integral assembly compounding a connector unit, a penetrator, and an optical fiber cable. The assembly of FIG. 14 is intended to convey how the connector and penetrator are used in an operational undersea environment.

A connector unit 350, equivalent to one of the units 201 or 202 described above, has an optical fiber penetrator 352, equivalent to the penetrator of FIGS. 12 and 13, sealingly attached to its rear portion 354. The penetrator is attached to the unit as illustrated in FIG. 12. The retaining plug of the penetrator is indicated by reference numeral 356. The outer surface 358 of the rear portion is threaded. An optical fiber cable 360 having a cable jacket feeds an optical fiber (not shown) to the penetrator and connector unit as described above. The cable 360 is attached conventionally to the penetrator 354. Strain relief between the cable and penetrator is provided by an end seal 362 formed of a material that is overmolded to the jacket of cable 362, penetrator 352, and threaded rear portion 354. The molded end seal 362 is grippingly engaged between the connector end portion threads and a mechanical clamp 364 that compressively clamps the seal 362 to the cable 360.

It is of course to be understood that the embodiment of the present invention hereinabove discussed is illustrative of an even wider variety of embodiments useful in practicing the invention. In any case, the scope of the invention is to be interpreted as defined by the appended claims.

I claim:
1. An underwater mateable fiber optic connector, comprising:
   a first unit with a hollow casing for receiving the end of a first optical fiber and including:
      support means in said casing for supporting said first optical fiber end;
      hollow probe means movable in said casing for being moved to a retracted position with respect to said support means exposing said first optical fiber end or to an extended position with respect to said support means sheathing said first optical fiber end; and
      a first interior chamber within said casing for containing said probe means and having a first fluidresistant seal movable in said casing and penetrable by said probe means for being moved to an extended position away from said probe means and a retracted position penetrated by and exposing said probe means; and
   a second unit with a body for receiving the end of a second optical fiber and for fitting to said first unit casing when said units are joined, and including:
      first stop means in said body for moving said first seal to its retracted position when said units are joined;
      a second interior chamber in said body with a second fluid-resistant seal penetrable by said probe means when said units are joined and said first seal is in its retracted position;
      second stop means in said second chamber for, when said units are joined and said probe has penetrated said first and second seals, moving said probe means to its retracted position; and
      an alignment means in said second chamber for, when said units are joined, holding said second optical fiber end and for receiving from said support means said first optical fiber end in optical alignment with said second optical fiber end.

2. The connector of claim 1 further including:
   first return means in said first unit for moving said probe means to its extended position when said units are disconnected; and
   second return means in said first unit for moving said first seal to its extended position when said units are disconnected.

3. The connector of claim 2 further including means for locking said first and second units together when they are joined.

4. The connector of claim 2 wherein said support means includes a tube assembly seated in said casing for holding said first optical fiber so that said first optical fiber end protrudes beyond said tube assembly.

5. The connector of claim 4 wherein said probe means includes a hollow probe tube slidably mounted on said support tube and having an end with an opening through which said first optical fiber end protrudes when said probe means is in said retracted position.

6. The connector of claim 5 wherein said probe tube includes an enlarged portion and said first return means includes a spring disposed in said enlarged portion between said probe tube and said support tube assembly.

7. The connector of claim 4 wherein said first seal includes a penetrable seal on an end of said first chamber and a spring guide assembly attached to said first chamber adjacent said seal and slidably contained in said casing.

8. The connector of claim 7 wherein said second return means includes a spring disposed between said casing and said spring guide assembly.

9. The connector of claim 1 wherein said second unit body includes a hollow cylinder with a front end for being inserted into said first unit casing.

10. The connector of claim 9 wherein said first stop means includes, on said body adjacent said front end, an annular lip defining an aperture adjacent said second seal through which said probe extends when said units are joined.

11. The connector of claim 10 wherein said alignment means includes a capillary tube with an axial passageway adjacent said second seal.

12. The connector of claim 11 wherein said second stop means includes, disposed between said capillary tube and said second seal, a receptacle for receiving said probe means and having adjacent said capillary axial passageway, an aperture through which said first optical fiber end penetrates when said probe means is placed in said retracted position.

13. The connector of claim 1 further including, in said first and second chambers, an optically-transmissive dielectric fluid.

14. The connector of claim 13 wherein each said unit includes means for venting the exterior of its respective interior chamber to an ambient connector pressure external to said connector.

15. The connector of claim 2, further including:
   an interior body support assembly in said second unit for supporting said first and second stop means, said second chamber and said second seal; and
   petalled engagement means in said first unit adjacent said first seal for being moved by said first stop means to a first position releasably engaging said support assembly when said units are joined or for being moved by said first stop means and said second return means to release said support assembly when said units are disconnected.

16. The connector of claim 15 wherein said first chamber includes an elongate flexible chamber and a chamber spacer inside such chamber to maintain the longitudinal dimension of said chamber.

17. The connector of claim 16 wherein said first chamber is slidably disposed on said probe means and is slidably moved to a first position by said first stop means when said units are joined.

18. The connector of claim 16 wherein said support means is slidable in said unit and further including means in said first unit for, when said first and second units are joined, providing a force on said support means in a direction that moves said first optical fiber end toward said second optical fiber end in said alignment means.

19. The connector of claim 2 further including means for preventing relative rotation between said first and second units when said units are joined.

20. The connector of claim 2 wherein each of said first and second units includes recess means for containing an excess length of optical fiber received by said unit.

21. The connector of claim 20 further including, in each of said first and second connector units, fluid communication means for permitting fluid to flow between the unit recess means and the unit interior chamber, optically transmissive fluid in the recess means and the interior chamber, and vent means for venting the exterior of the unit's interior chamber to an ambient pressure external to said connector.

22. The connector of claim 2 wherein said alignment means includes an elastomeric sleeve and three longitudinally tapered elongate rods held in said sleeve in a triangular stack to form a cusped central alignment aperture for receiving and aligning a pair of abutting optical fiber ends.

23. An apparatus for butt-joining a pair of optical fibers underwater, comprising:
a first unit containing:
support means for supporting an end of a first optical fiber;
hollow probe means covering said support means for being moved to one position exposing said first fiber end; and
a first fluid-filled interior bladder enclosing said probe means and support means and having a fluid-tight, movable seal means penetrable by said probe means for being moved to one position penetrated by and exposing said probe means; and
a second unit for being coupled to said first unit and having:
a first stop means for moving said seal means to said position exposing said probe means when said units are coupled;
a second fluid-filled interior bladder having a fluid-tight seal penetrable by said probe means when said units are coupled;
a second stop means in said second interior bladder for placing said probe means in said position exposing said first fiber end when said units are coupled; and
alignment means in said second bladder and adjacent said second stop means for aligning the first fiber end with an end of a second optical fiber.

24. The apparatus of claim 23 wherein said probe means penetrates said second bladder seal substantially simultaneously with said first stop means moving said first bladder seal means to said first position exposing said probe means.

25. The apparatus of claim 24 wherein said second stop means places said probe means in said position exposing said first fiber end after said probe means has penetrated said second bladder seal.

26. The apparatus of claim 25 wherein said alignment means aligns said first and second fiber ends after said probe means has been placed in said position by said second stop means.

27. The apparatus of claim 26 wherein said units are demateable, and further including, in said first unit:
means for, when said units are demated, moving said probe means to another position covering said support means and fiber end; and
means for, when said units are demated, moving said first bladder seal to a position off of and away from said probe means which permits said first bladder to enclose said probe means.

28. The apparatus of claim 23 wherein said second unit has a front end for being inserted into said first unit, said first stop means is a stopping surface adjacent said front end and said second bladder seal is disposed adjacent said stopping surface.

29. The apparatus of claim 28 wherein said second stop means is an apertured receptacle disposed in said second bladder for receiving said probe.

30. The apparatus of claim 29 wherein said alignment. means includes a capillary tube disposed in said second bladder adjacent said receptacle.

31. The apparatus of claim 23 including, in each said unit, pressure-compensation means for equalizing the pressure on the bladder contained in said unit 40 with an ambient pressure external to said unit.

32. A fiber-to-fiber optical connector for use in a high ambient pressure environment, comprising:
first connector unit including:
hollow probe means for containing the terminal end of a first opticl fiber and for being moved to a first position exposing said first fiber terminal end;
movable interior chamber means in the interior of said first unit for containing said probe means and for being moved to a position exposing said probe means; and
a first fluid-resistant seal means in said movable chamber means for being penetrated by said probe means when said movable chamber means is moved to said exposing position; and
a second connector unit for coupling with said first unit and including:
first stop means for moving said movable chamber means to said exposing position when said units are coupled;
an interior chamber in the interior of said second unit;
a second fluid-tight seal on said interior chamber penetrable by said probe means when said units are coupled and said first stop has moved said interior chamber means to said exposing position;
second stop means in said interior chamber for moving said probe means to said position exposing said fiber terminal end when said units are coupled; and
alignment means in said interior chamber for holding the terminal end of a second optical fiber and for aligning said first and second fiber terminal ends when said connector units are coupled.

33. The connector of claim 32 further including in said second connector unit central structural means for supporting said interior chamber, said first and second stop means, and said alignment means and, in said first connector unit, movable engagement means for releasably engaging said central structural means when said first and second connector units are coupled and for, while said probe means is penetrating said first and second seals, maintaining alignment between said first and second seals.

34. The connector of claim 33 further including fiber support means movably held in said first connector unit for supporting said first fiber terminal end and bias means in said first connector unit for, when said connector units are coupled, exerting a bias force on said fiber support means that urges said first fiber terminal end toward said second fiber terminal end in said alignment means.

35. The connector of claim 34 further including means for preventing rotation of said first and second connector units around said first and second fiber terminal ends when said connector units are coupled.

36. The connector of claim 35 further including a respective rear chamber means in each of said first and second connector units for containing an excess length of the optical fiber whose terminal end is contained in said connector unit.

37. The connector of claim 36 further including an optically transmissive fluid having an index of refraction that is matched to the indices of refraction of said first and second fiber terminal ends, first port means in said first connector unit for conducting an amount of said fluid between said first rear chamber means and said interior chamber means, and second port means in said second connector unit for conducting another amount of said fluid between said interior chamber and said second rear chamber means.

38. The connector of claim 37 further including in said first connector unit first vent means for venting said interior chamber means to an outside high pressure environment in which said connector is disposed and second vent means in said second connector unit for venting said high pressure ambient environment to said interior chamber.

39. The connector of claim 38 further including in each of said first and second connector units, fluid-resistant, pressure-resistant fiber penetrating means for feeding an optical fiber into said connector unit while resisting the transfer of the pressure of said ambient environment from the interior of said connector unit.

40. An underwater-mateable optical fiber connector, comprising:
a receptacle connector unit including a first chamber means for providing a pressure-compensated protective environment isolating an exposed optical fiber end from contact with an ambient underwater environment, and alignment means disposed in said first interior chamber means for butt-joining a pair of exposed optical fiber ends; and
a probe connector unit for being joined with said first unit and including second interior chamber means for providing a pressure-compensated, protective environment isolating an exposed optical fiber end from contact with said ambient underwater environment, and fiber guide and transport means in said second chamber means for, when said receptacle and probe units are joined, moving an exposed optical fiber end from said second chamber means to said first chamber means while isolating said exposed optical fiber end from contact with said ambient underwater environment and for guiding said exposed optical fiber end to operative engagement with another exposed optical fiber end in said alignment device.

41. The connector of claim 40 wherein:
said first interior chamber means includes a first flexible bladder with a penetrable fluid-resistant seal;
said alignment means includes an optical fiber receiving and alignment mechanism for holding an exposed optical fiber end in said first flexible bladder and for receiving, in abutting optical alignment with said first exposed optical fiber end, a second exposed optical fiber end;
said second chamber means includes an elongate flexible bladder with a penetrable, fluid-resistant seal and a spacer disposed in said elongate bladder for maintaining a longitudinal dimension of said elongate bladder; and
said fiber guide and transport means includes support means for, when said first and second units are joined, moving an exposed optical fiber end from said second to said first bladder and into said alignment mechanism and probe means retractably sheathing said support means and exposed optical fiber end for, when said units are joined, penetrating said first and second bladder seals to provide protected movement of said support means between said bladders and for being operated upon by said alignment mechanism to unsheath said support means and permit movement of said exposed optical fiber end into said alignment mechanism.

42. The connector of claim 41 further including means for, when said units are unmated, moving said probe means to a position resheathing said support means and exposed optical fiber end.

43. The connector of claim 42 further including means for, when said probe means is moved to said resheathing position, retracting said probe means from said second bladder seal and positioning said probe and sheathed support means and optical fiber end in said second flexible bladder.

44. The connector of claim 41 wherein said first and said second bladder means each contain an optically-transmissive fluid and each of said connector units further includes sealing means for preventing the exchange of fluid between its respective bladder and said ambient underwater environment.

45. The connector of claim 44 further including respective vent means in each of said receptacle and plug units for venting each of said bladders to said ambient underwater environment.

46. A penetrator device for providing a fluid- and pressure-resistant path for an optical fiber through a pressure differential barrier, comprising:
housing means for penetrating a pressure-differential barrier and for providing a two-ended opening through said barrier;
retaining means seatable in a first end of said opening for retaining a mechanism in said opening; and
a compressive sealing means retained in said opening by said retaining means and responsive to a pressure differential acting across said barrier and through said opening toward said first end for compressively sealing to a circumferential portion of the surface of an optical fiber extending through said opening.

47. The penetrator device of claim 46 wherein said compressive sealing means includes:
   a follower means slidably contained in said opening for being moved toward said first end in response to said pressure differential;
   a compression member, contained in said opening adjacent said retaining means, and having a conical recess;
   a compressible, cone-shaped seal means sandwiched between said follower means and said compression member for being urged by said follower means into a compressive sealing engagement in said conical recess; and
   aperture means in said seal means for providing an optical fiber passage that is compressibly constricted when said seal means compressively engages said conical recess.

48. The penetrator device of claim 47 further including stop means adjacent said second end for retaining said follower means in said opening near said second end and wherein said compression member is movably contained in said opening and undergoes movement against said seal means in response to the seating of said retaining means, said movement providing an initial compressive sealing engagement between said seal means and said conical recess.

* * * * *

UNITED STATES PATENT AND TRADEMARK OFFICE
CERTIFICATE OF CORRECTION

PATENT NO. : 4,682,848

DATED : July 28, 1987

INVENTOR(S) : Cairns et al.

It is certified that error appears in the above-identified patent and that said Letters Patent is hereby corrected as shown below:

Column 20, claim 32, line 37 "opticl" should read

--optical--

Signed and Sealed this

Nineteenth Day of April, 1988

Attest:

DONALD J. QUIGG

Attesting Officer

Commissioner of Patents and Trademarks